(12) United States Patent
Cheriyath et al.

(10) Patent No.: US 8,918,373 B2
(45) Date of Patent: Dec. 23, 2014

(54) MESSAGE CONTROLLER WITH DYNAMICALLY LOADABLE MESSAGE DESCRIPTOR

(75) Inventors: Rithesh Cheriyath, Karnataka (IN); SatyaBhaskar Payasam, Kakinada (IN); Maninder Chhabra, Nagpur (IN); Sanjiv Agarwala, Bangalore (IN); SaiGopal Tumulu, Bangalore (IN); Kiran Sajeev, Kerala (IN)

(73) Assignee: Honeywell International Inc., Morristown, NJ (US)

( * ) Notice: Subject to any disclaimer, the term of this patent is extended or adjusted under 35 U.S.C. 154(b) by 1801 days.

(21) Appl. No.: 11/936,206

(22) Filed: Nov. 7, 2007

(65) Prior Publication Data
US 2009/0119326 A1  May 7, 2009

(51) Int. Cl.
*G06F 17/30* (2006.01)
(52) U.S. Cl.
CPC .................................. *G06F 17/3092* (2013.01)
USPC ........... 707/693; 707/609; 707/688; 707/736; 707/758; 707/813

(58) Field of Classification Search
USPC .......... 707/609, 687, 688, 693, 736, 758, 781
See application file for complete search history.

(56) References Cited

U.S. PATENT DOCUMENTS

| | | | |
|---|---|---|---|
| 7,124,299 B2 | 10/2006 | Dick et al. | |
| 2004/0056890 A1 | 3/2004 | Hao et al. | |
| 2006/0015816 A1 | 1/2006 | Kuehner et al. | |
| 2006/0069512 A1* | 3/2006 | Rzhetsky et al. | 702/19 |
| 2008/0033951 A1* | 2/2008 | Benson | 707/8 |

* cited by examiner

*Primary Examiner* — Sana Al Hashemi
(74) *Attorney, Agent, or Firm* — Fogg & Powers LLC

(57) ABSTRACT

A dynamic message controller is provided. The message provider includes a plurality of message descriptors and a message parser. Each message descriptor includes a unique pattern for a message that corresponds to a specific type of message received by the message controller. The message parser module is configured to match incoming messages with a select one of the message descriptors based on matched message patterns. The message parser module is further configured to load the matched message descriptor and parse an associated incoming message based on the matched message descriptor.

18 Claims, 3 Drawing Sheets

MESSAGE CONTROLLER WITH DYNAMICALLY LOADABLE MESSAGE DESCRIPTOR

BACKGROUND

A Global Data Center (GDC) acts as a communications hub to facilitate thousands of air-to-ground and ground-to-air messages daily utilizing a variety of VHF and satellite datalink communications networks. Accessed directly from the aircraft's Flight Management System (FMS), convenient datalink messaging enables flight crews to keep in touch with the ground during all phases of flight. One issue that arises in the above system is that the message types used by aircrafts are prone to frequent changes. Hence, every time a new requirement for handling a new kind of message type comes in, the GDC has to figure out how to process the message. Moreover, different aircraft have different modules that use different message types (or different formats). For example, a first aircraft may send a position report to the GDC that contained the aircraft's latitude and longitude in a first format. A second aircraft of a different type would send its position data using a different format. Efforts to resolve this issue involved using multiple processing modules, each adapted to handle a specific message types with their specific logic arrangement. However, due to the frequent changes and additions to message types, occurrence regression is high and the process becomes inefficient.

For the reasons stated above and for other reasons stated below which will become apparent to those skilled in the art upon reading and understanding the present specification, there is a need in the art for a method for effectively and efficiently handling different types of messages in a GDC system.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a message controller is provided. The message controller includes a plurality of message descriptors and a message parser. Each message descriptor includes a unique pattern for a message that corresponds to a specific type of message received by the message controller. The message parser module is configured to match incoming messages with a select one of the message descriptors based on matched message patterns. The message parser module is further configured to load the matched message descriptor and parse an associated incoming message based on the matched message descriptor.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention use a Dynamically Loadable Message Descriptor (DLMD) that enables efficient and flexible message parsing. DLMD facilitates easy extensibility (plug'n'play) of application functionality. This is achieved because of the loosely coupled behavior of the design model. DLMD is a unique combination of extendable markup language (XML) and regular expressions. In particular, the XML is used to achieve the modular capability while the regular expressions are used for pattern matching.

Figure 1:
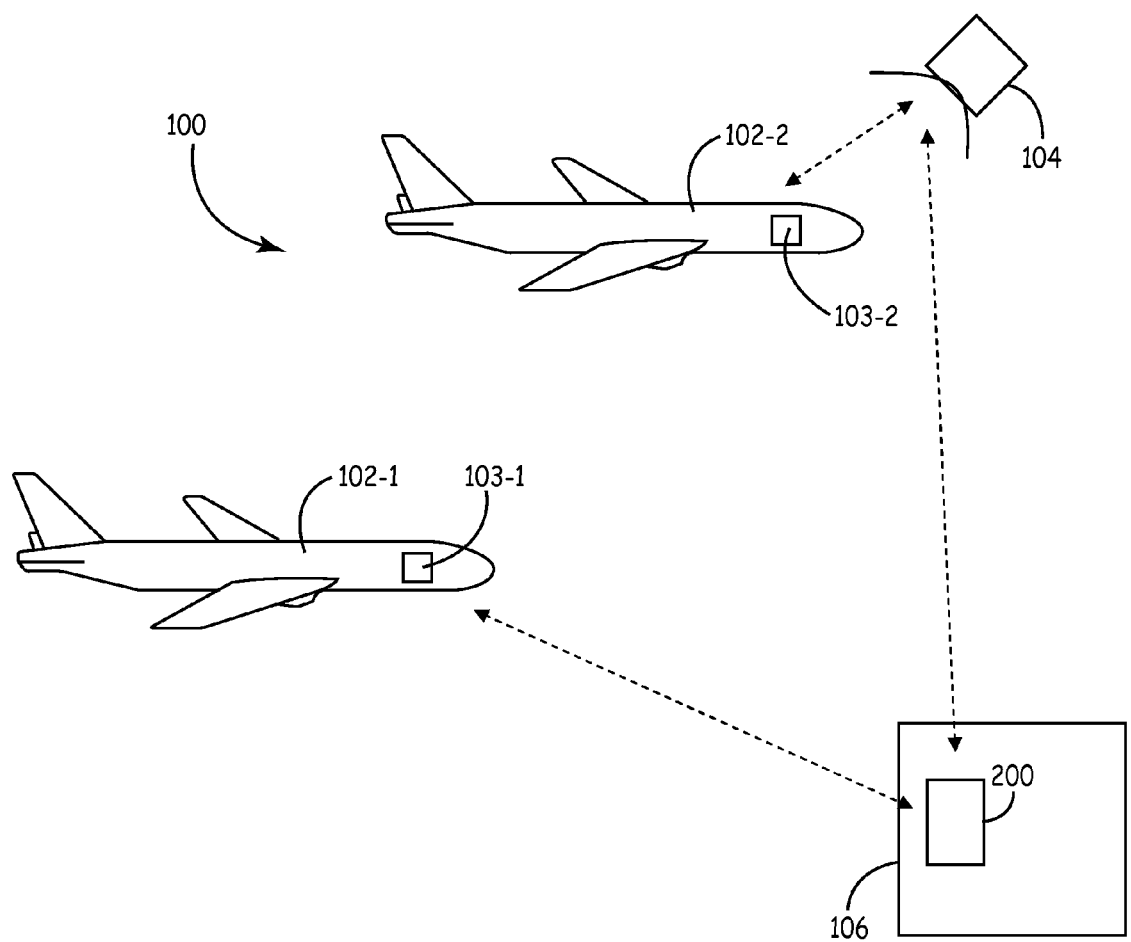
FIG. 1 is an illustration of a flight communication system of one embodiment of the present invention.

As stated above, the DLMD is a design model that uses regular expression and XML to parse messages based on rules mentioned in the message descriptor. Hence the implementation logic is separated from the message specification. Through this separation, message contents can be dynamically established with any updated specification simply by loading the appropriate message descriptor. Referring to FIG. 1, a flight communication system 100 of one embodiment is illustrated. As illustrated, this embodiment includes aircraft 102-1 and 102-2. Each aircraft includes a flight management system (FMS) 103-1 and 103-2 to communicate with a global data center (GDC) 106. In this example, the FMS 103-1 of the first aircraft 102-1 is in direct communication with the GDC 106 and the FMS 103-2 of the second aircraft 102-2 is in communication with the GDC 106 via satellite 104. The GDC 106 includes a message controller 200 that processes messages using a message controller with a dynamically loadable message descriptor.

Figure 2:
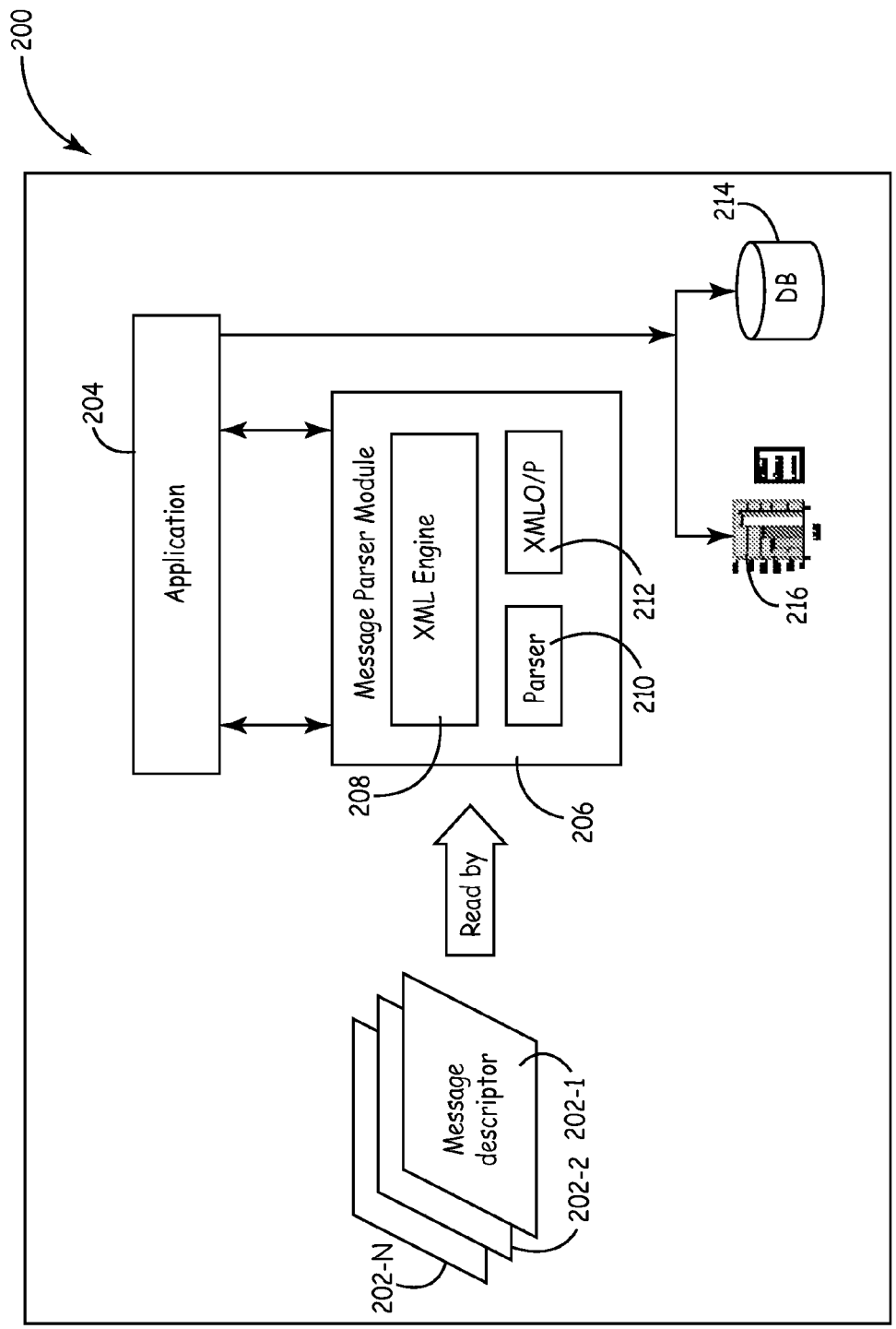
FIG. 2 is a block diagram of a message controller of one embodiment of the present invention.

There are two major components to the message controller 200, a message description file 202 (1-N) and a message parser module 206. One embodiment of the message controller 200 is illustrated in FIG. 2. As illustrated, the message controller 200 further comprises an application 204 which includes the input messages from aircraft. The message description file 202 is an XML based file which contains the pattern of the message. This message descriptor 202 is dynamically loaded by the parser module 206 depending on the type of message. The message parser module 206 is where the message parsing logic (210) is implemented and is constant for any kind of message because of this design model. With the dynamic loadable message descriptor 202, the constant change of message rules can be tackled easily by just modifying the descriptor 202 without interfering with the core logic 210. By separating the logic from the implementation, embodiments ensure that only the descriptor 202 is updated with any message rule changes. The implementation is updated implicitly. Also if there is a new message type, a new descriptor 202 with the specific rules can be introduced.

The message description file 202 is the core to this concept. This is a XML based file containing the pattern to be matched with the message. The descriptor file 202 also specifies the information required for tagging the pattern matches. The descriptor 202 is dynamically selected and loaded depending on the message type. An output of the massage parser module 206 will be a XML file with the parsed values embedded in the XML via the XMLO/P 212. The message parser module 206 is run by the XML engine 208. Examples of the input message, message-descriptor and the output xml are given below.

Input Message:

```
{SOH}QU HDQGLXH{CR}{LF}
.DDLXCXA 170000{CR}{LF}
{STX}M44{CR}{LF}
FI GS0/AN VV377{CR}{LF}
DT DDL XXD 170000 M52A{CR}{LF}
-POS02,N38436W093336,GRD,KADW,KSZL,0617,0000,0000,
16.4{CR}{LF}
{ETX}
```

Message Descriptor:

```
-<xml>
  -<line num="1">
    <regex>-
\s\s+(.{3})(.{2}),(.{6})(.{7}),(.*?),(.*?),(.*?),(.*?),(.*?),(.*?),(.*?)\
x03
    </regex>
    -<values>
      <var name="imi" value="$1" />
      <var name="format-version" value="$2" />
      <var name="position" value="$3.$4" />
      <var name="flight-level" value="$5" />
      <var name="departure-airport" value="$6" />
      <var name="destination-airport" value="$7" />
      <var name="date" value="$8" />
      <var name="timestamp" value="$9" />
      <var name="eta" value="$10" />
      <var name="fuel-on-board" value="$11" />
    </values>
  </line>
</xml>
```

Output xml:

```
<?xml version="1.0" ?>
-<xml>
  -<message>
    <message-priority>QU</message-priority>
    <destination-adns>HDQGLXH</destination-adns>
    <supplimentary-adns-list />
    <source-adns>DDLXCXA</source-adns>
    <timestamp>170000</timestamp>
    <smi>M44</smi>
    <flight-identifier>GS0</flight-identifier>
    <tail-number>VV377</tail-number>
    <dsp-id>DDL</dsp-id>
    <ground-station>XXD</ground-station>
    <msn>M52A</msn>
    <equipment-type>HMFA02</equipment-type>
    -<free_text-list>
      <free-text id="imi">POS</free-text>
      <free-text id="format-version">02</free-text
      <free-text id="position">N38436W093336</free-text>
      <free-text id="flight-level">GRD</free-text>
      <free-text id="departure-airport">KADW</free-text>
      <free-text id="destination-airport">KSZL</free-text>
      <free-text id="date">0617</free-text>
      <free-text id="timestamp">0000</free-text>
      <free-text id="eta">0000</free-text>
      <free-text id="fuel-on-board">16.4</free-text>
    </free_text-list>
  </message>
  <application-data />
</xml>
```

The <regex> tag in the example descriptor contains the pattern that needs to be applied on the message and the <values> tag contains the variable names and the values to be parsed and stored. This output XML 212 acts as the input to the application 204 processing the messages. The output XML file 212 can also be stored in the database 214 for further usage or can be fed to a graph generator module 216 to draw graphs using the values from the output XML 212.

Figure 3:
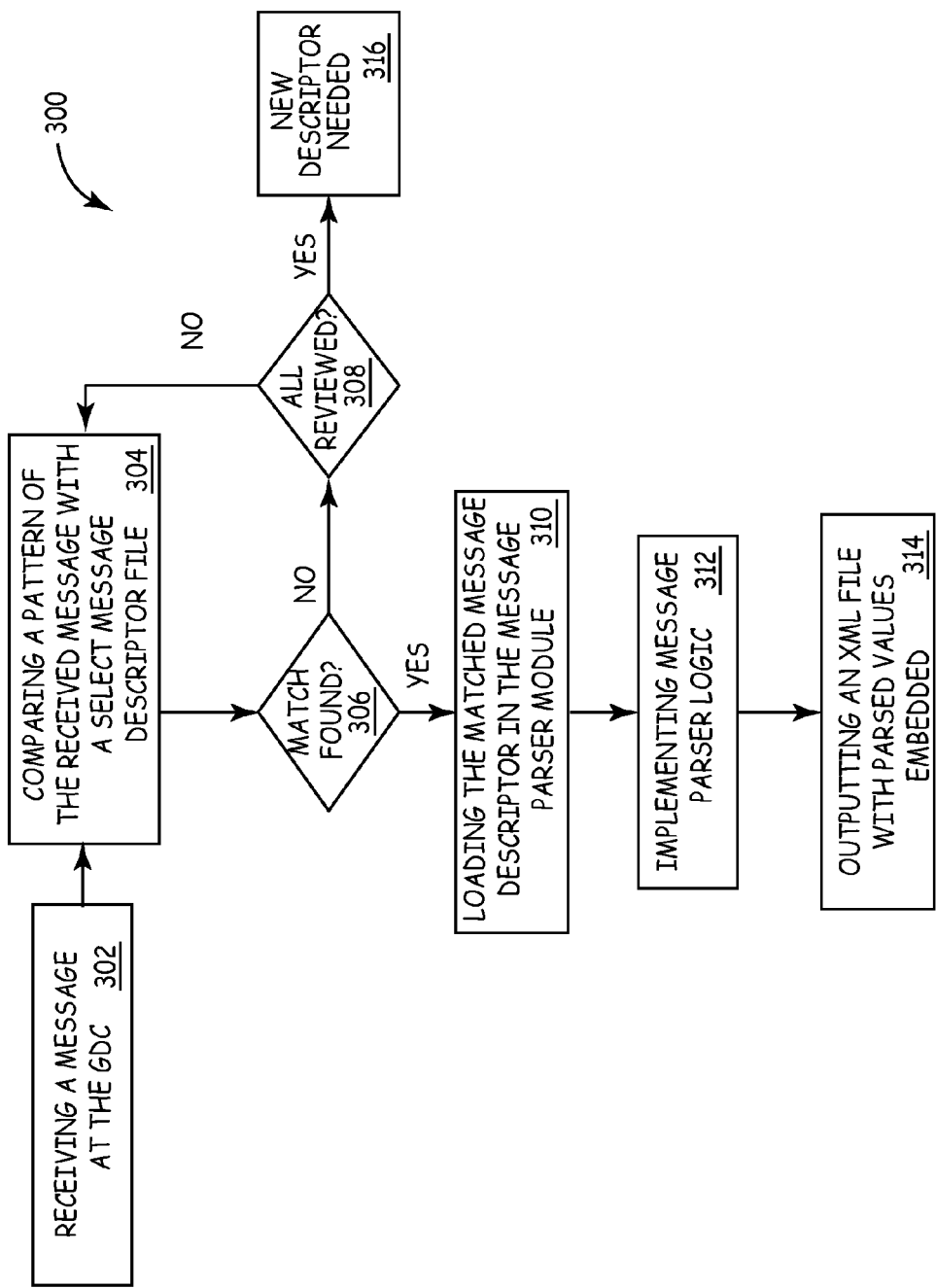
FIG. 3 is a message controller flow diagram of one embodiment of present invention.

Referring to FIG. 3 a message controller flow diagram 300 is illustrated. As illustrated, the process starts in this embodiment when a message is received at the GDC (302). As discussed above, the message may come directly from a FMS of an aircraft or via satellite. One a message as been received, a pattern in the message (that indicates the type of message) is compared with a message descriptor file (304). If there is not a match 306, it is determined if all of the message descriptors have been reviewed for a match (308). If they all have not been reviewed (308), the process continues at (304). If they have all been reviewed at (308) and no match has been found at (306), a new message descriptor is needed (316). Once a match has been found (306), the matched message descriptor is loaded in the message parser module (310). The message parser logic is then implemented on the received message (312). An output file is then output with parsed values embedded (314). As described above, the output is provided to the application function for processing. The output could also be stored in a database for further usage or feed to a graphic module.

The methods and techniques used by the components of the message controller 200 as described above can be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Although specific embodiments have been illustrated and described herein, it will be appreciated by those of ordinary skill in the art that any arrangement, which is calculated to achieve the same purpose, may be substituted for the specific embodiment shown. For example, although the dynamically loadable message descriptor is explained in relation to aircraft communication other types of communication systems could implement embodiments of the invention. Hence, this application is intended to cover any adaptations or variations of the present invention. Therefore, it is manifestly intended that this invention be limited only by the claims and the equivalents thereof.

The invention claimed is:

1. A message controller comprising:
   a plurality of message descriptors, each message descriptor including a unique pattern for a message that correspond to a specific type of message received by the message controller; and
   a message parser module configured to match incoming messages with a select one of the message descriptors based on matched message patterns, the message parser module further configured to load the matched message descriptor and parse an associated incoming message based on the matched message descriptor.

2. The message controller of claim 1, wherein the plurality of message descriptors are each a unique combination of extendable markup language (XML).

3. The message controller of claim 1, further comprising:
   an application configured to process parsed messages.

4. The message controller of claim 1, wherein the message parser module further comprises:
   an engine to run operations of the message parser module;
   a parser to parse the incoming message based on the matched associated message descriptor; and
   an output function to output the parsed incoming message.

5. The message controller of claim 4, wherein the engine is a XML engine and the output function is an XML output function.

6. A method of implementing processing messages of different types, the method comprising:
   matching patterns in an incoming message with patterns in one of a plurality of message descriptors;
   loading the matched message descriptor with a message parser module;
   parsing the incoming message based on the loaded message descriptor with the message parser module; and
   outputting the parsed incoming message for use.

7. The method of claim 6, wherein each message descriptor is an XML based file containing a pattern associated with a select type of message.

8. The method of claim 6, wherein parsing the incoming message further comprises:
   implementing parsing logic pursuant to the loaded matched message descriptor.

9. The method of claim 6, further comprising:
   creating new message descriptor when a new type of message is to be used.

10. The method of claim 6, further comprising:
    when a matched pattern cannot be found in the plurality of message descriptors, creating a new message descriptor with an associated pattern.

11. The method of claim 6, further comprising:
    storing the output of the incoming message in a database.

12. The method of claim 6, further comprising:
    using the output of incoming message to form a graph.

13. The method of claim 6, wherein outputting the parsed incoming message for use further comprises:
    outputting the parsed incoming messages to an application.

14. The method of claim 13, further comprising:
    processing the output parsed incoming message with the application.

15. A program product comprising program instructions embodied on a processor-readable medium for execution by a programmable processor, wherein the program instructions are operable to cause the programmable processor to:
    match patterns in an incoming message with patterns in one of a plurality of message descriptors;
    load the matched message descriptor with a message parser module;
    parse the incoming message based on the loaded message descriptor with the message parser module; and
    output the parsed incoming message for use.

16. The program product of claim 15, wherein each message descriptor is an XML based file containing a pattern associated with a select type of message.

17. The program product of claim 15, wherein the program instructions are further operable to cause the programmable processor to:
    implement parsing logic pursuant to the loaded matched message descriptor.

18. The program product of claim 15, wherein the program instructions are further operable to cause the programmable processor to:
    process the output parsed incoming message with an application.

* * * * *